United States Patent
Swayne et al.

(10) Patent No.: US 10,561,277 B1
(45) Date of Patent: Feb. 18, 2020

(54) AIR FRY COOKING METHOD AND APPARATUS

(71) Applicant: Electrolux Home Products, Inc., Charlotte, NC (US)

(72) Inventors: Steven M. Swayne, Springfield, TN (US); Timothy Turner, Springfield, TN (US)

(73) Assignee: Electrolux Home Products, Inc., Charlotte, NC (US)

( * ) Notice: Subject to any disclaimer, the term of this patent is extended or adjusted under 35 U.S.C. 154(b) by 0 days.

(21) Appl. No.: 16/366,477

(22) Filed: Mar. 27, 2019

Related U.S. Application Data (60) Provisional application No. 62/795,896, filed on Jan. 23, 2019.

(51) Int. Cl.
| | |
|---|---|
| *H05B 3/68* | (2006.01) |
| *F27B 5/14* | (2006.01) |
| *A21B 1/00* | (2006.01) |
| *A47J 37/06* | (2006.01) |
| *A23L 5/10* | (2016.01) |
| *F24C 7/08* | (2006.01) |
| *A21B 1/24* | (2006.01) |

(52) U.S. Cl.
CPC ............ *A47J 37/0641* (2013.01); *A23L 5/17* (2016.08); *A21B 1/245* (2013.01); *F24C 7/08* (2013.01)

(58) Field of Classification Search
CPC .... A47J 37/0623; A47J 37/0641; A47J 27/00; A47J 37/00; A47J 37/01; A47J 37/015; A47J 37/10; A47J 37/105; A47J 43/046

USPC ............................. 219/390–400, 443.1–468.2
See application file for complete search history.

(56) References Cited

U.S. PATENT DOCUMENTS

| | | |
|---|---|---|
| 3,624,742 A | 11/1971 | Hurko |
| 3,751,632 A | 8/1973 | Kauranen |
| 4,802,459 A | 2/1989 | McFadden et al. |

(Continued)

FOREIGN PATENT DOCUMENTS

| | | |
|---|---|---|
| WO | 2018104351 | 6/2018 |
| WO | 2018148363 | 8/2018 |

OTHER PUBLICATIONS

Optimization of Tenderness During Cooking of Cylindrical Beef Semitendinosus Roasts Using a Computer Heat and Mass Transfer Model. Thomas Hamilton Powell. 1997. found at https://search.proquest.com/docview/304349696?accountid=142944. 137 pages.

(Continued)

*Primary Examiner* — Sang Y Paik
(74) *Attorney, Agent, or Firm* — Pearne & Gordon LLP (57) ABSTRACT

A method is disclosed for cooking food in an oven cavity, where air is the cooking medium. Using a predetermined cooking algorithm, a temperature of the oven cavity is adjusted in a plurality of temperature and/or time regulated cooking stages. An initial pre-heat stage targets a first target temperature including a user-selected oven cavity temperature plus a first offset. A subsequent post-heat stage targets a second target temperature including the user-selected temperature plus a second offset different from the first offset. Two or more heating elements and a fan are operated during the post-heat stage according to a duty cycle controlled via a hysteresis temperature control algorithm or a PID temperature control algorithm.

29 Claims, 6 Drawing Sheets

(56) References Cited

U.S. PATENT DOCUMENTS

| | | | |
|---|---|---|---|
| 5,321,232 A | 6/1994 | Ogle | |
| 5,432,321 A * | 7/1995 | Gerl | F24C 7/087 |
| | | | 219/413 |
| 5,620,623 A | 4/1997 | Baker | |
| 5,801,362 A | 9/1998 | Pearlman et al. | |
| 6,222,163 B1 | 4/2001 | Arntz et al. | |
| 6,337,468 B1 | 1/2002 | Worthington | |
| 6,388,235 B1 | 5/2002 | Sauter et al. | |
| 6,570,136 B1 | 5/2003 | Lockwood et al. | |
| 6,727,478 B2 | 4/2004 | Rael et al. | |
| 6,730,881 B1 | 5/2004 | Arntz et al. | |
| 6,734,403 B2 | 5/2004 | Baker et al. | |
| 6,812,433 B1 | 11/2004 | Barritt | |
| 6,815,644 B1 | 11/2004 | Muegge et al. | |
| 6,895,953 B2 | 5/2005 | Larsen et al. | |
| 6,943,322 B1 | 9/2005 | Whipple, Jr. | |
| 6,979,804 B1 | 12/2005 | Boyer | |
| 7,368,686 B2 | 5/2008 | Etheredge et al. | |
| 7,381,930 B2 | 6/2008 | Fisher et al. | |
| 7,411,160 B2 | 8/2008 | Duncan et al. | |
| 7,468,495 B2 * | 12/2008 | Carbone | F24C 15/325 |
| | | | 126/21 A |
| 7,493,362 B2 | 2/2009 | Bogatin et al. | |
| 7,759,617 B2 | 7/2010 | Bowles et al. | |
| 7,921,767 B2 | 4/2011 | Cook et al. | |
| 8,049,142 B2 | 11/2011 | Blackson et al. | |
| 8,053,708 B2 | 11/2011 | Fisher | |
| 8,097,833 B2 | 1/2012 | Bonuso et al. | |
| 8,173,942 B2 | 5/2012 | Wiseman et al. | |
| 8,274,020 B2 | 9/2012 | Donarski et al. | |
| 8,475,162 B2 | 7/2013 | Barritt et al. | |
| 8,563,901 B2 | 10/2013 | Hitchcock et al. | |
| 8,674,270 B2 | 3/2014 | Anderson et al. | |
| 8,697,166 B2 | 4/2014 | Embury et al. | |
| 8,776,776 B2 | 7/2014 | Todd et al. | |
| 8,835,812 B2 | 9/2014 | Braden et al. | |
| 9,057,526 B2 | 6/2015 | Barritt | |
| 9,119,231 B2 | 8/2015 | Johnson et al. | |
| 9,335,054 B2 | 5/2016 | Donarski | |
| 9,506,657 B2 | 11/2016 | Armstrong et al. | |
| 9,803,875 B2 | 10/2017 | Barber et al. | |
| 2004/0089648 A1 | 5/2004 | Griffey et al. | |
| 2007/0084849 A1 * | 4/2007 | Smith | F24C 7/08 |
| | | | 219/413 |
| 2007/0246452 A1 | 10/2007 | Blackson et al. | |
| 2007/0278319 A1 | 12/2007 | Jenkins et al. | |
| 2009/0250451 A1 | 10/2009 | Blackson | |
| 2010/0303985 A1 * | 12/2010 | De'Longhi | A47J 37/10 |
| | | | 426/438 |
| 2011/0284518 A1 * | 11/2011 | Elston, III | F24C 7/087 |
| | | | 219/391 |
| 2013/0008426 A1 | 1/2013 | Newsom et al. | |
| 2014/0261386 A1 | 9/2014 | Bringe et al. | |
| 2014/0366746 A1 * | 12/2014 | Tsai | A47J 37/00 |
| | | | 99/403 |
| 2016/0040892 A1 | 2/2016 | Wiseman et al. | |
| 2017/0343221 A1 | 11/2017 | Swayne et al. | |
| 2018/0187902 A1 | 7/2018 | Bruin-Slot et al. | |

OTHER PUBLICATIONS

Systematic Testing of Reactive Software with Non-Deterministic Events: A Case Study on LG Electric Oven, Yongbae Park, Shin Hong, Moonzoo Kim. May 16-24, 2015. Found at http://citeseerx.ist.psu.edu/viewdoc/download?doi=10.1.1.717.4491&rep=rep1&type=pdf. 10 pages.

Cuisinart—Air Fryer Toaster Oven—Stainless Steel. Jan. 25, 2018. Found at https://web.archive.org/web/20180125105040/https://www.bestbuy.com/site/cuisinart-air-fryer-toaster-oven-stainless-steel/6073801.p?skuId=6073801. 1 page.

MW5100H Convection MWO with Sensor, 28 L. Feb. 6, 2018. Found at https://web.archive.org/web/20180206230646/https://www.samsung.com/uk/cooking-appliances/microwave-oven-convection-mc28h5135ck/. 1 page.

June returns with a cheaper smart oven for lazy cooks. Aug. 7, 2018. Found at https://www.engadget.com/2018/08/07/june-oven-second-gen/?ncid=txtlnkusaolp00000616. 1 page.

What Is an Air Fryer? Nov. 19, 2014. https://web.archive.org/web/20141119101328/http://q-n-c.com/faq/what-is-an-air-fryer/. 2 pages.

Google shopping search re "air fry". Nov. 1, 2018. 4 pages.
Google image search re "air fry appliance". Nov. 1, 2018. 9 pages.
Google shopping search re "air fry appliance". Nov. 1, 2018. 4 pages.
Google image search re "air fry oven". Nov. 1, 2018. 11 pages.
Google shopping search re "air fry oven". Nov. 1, 2018. 5 pages.
Google image search re "air fry range". Nov. 1, 2018. 6 pages.
Google shopping search re "air fry range". Nov. 1, 2018. 4 pages.
Google image search re "air fry". Nov. 1, 2018. 9 pages.

* cited by examiner

FIG. 6

AIR FRY COOKING METHOD AND APPARATUS

CROSS-REFERENCE TO RELATED APPLICATIONS

This application claims the benefit of U.S. provisional patent application Ser. No. 62/795,896 filed Jan. 23, 2019, the contents of which are incorporated by reference.

FIELD OF THE INVENTION

The present disclosure is directed to a food cooking method and apparatus. More specifically, the disclosure is directed to an apparatus and method for cooking food via hot air, such as via air fry style cooking.

BACKGROUND

Conventionally, air frying refers to the frying of food with reduced or no use of frying oil, potentially reducing the fat content of the resulting food. In this style of cooking, food is cooked out of an oil bath or similar medium and instead is cooked "in air." If desired, the food may be pre-coated with a thin layer of oil or oil substitute for the air frying process. Due to rapid heat transfer properties of air and to the rapid circulation of the air by an internal motive element providing a generally consistent temperature throughout the respective cooking vessel, a resulting food having a crispy exterior can be produced that is similar to a traditionally oil-fried food.

BRIEF SUMMARY

A cooking method performs air fry style cooking in an oven cavity of a cooking appliance, where air, not oil, serves as the cooking medium. Using a dedicated air fry algorithm to control a plurality of heating elements and an associated fan, a temperature of the oven cavity is adjusted in a plurality of temperature and/or time regulated cooking stages. An initial pre-heat stage for pre-heating the oven cavity includes time control according to a stage-specific timed duty cycle, and temperature control targeting a first target temperature including a user-selected oven cavity temperature plus a first offset. A subsequent post-heat stage for cooking a food item includes temperature control according to a stage-specific timed duty cycle targeting a second target temperature including the user-selected temperature plus a second offset different from the first offset, where two or more heating elements and the associated fan are operated during the respective duty cycle in accordance via either hysteresis- or PID-control.

According to an aspect, a method for cooking food via hot air in a kitchen range includes (a) receiving a user selection to activate a predetermined cooking mode including a pre-determined plurality of sequential heating stages, (b) receiving a user input of a desired cooking temperature setpoint, and (c) heating an oven cavity of the kitchen range during a first pre-heat stage of the plurality of sequential heating stages targeting a first target temperature comprising said setpoint plus a first offset. The method further includes (d) thereafter cooking the food within the oven cavity during a post-heat stage of the plurality of sequential heating stages, where during said post-heat stage a convection fan, a convection heating element and at least one of a bake heating element or a broil heating element is operated according to a post-heat duty cycle targeting a second target temperature. Said second target temperature comprises said setpoint temperature and a second offset different than the first offset.

According to another aspect, a method for air frying a food item in an oven cavity of a kitchen range is provided. The method includes initially heating the oven cavity targeting a first target temperature during a first pre-heat stage via feedback control based on both time and temperature parameters, subsequently heating the oven cavity during a post-heat stage targeting a second target temperature via feedback control based on at least a temperature parameter, said oven cavity being heated during said post-heat stage according to a timed duty cycle during which a fan during is operated for a full duration of the duty cycle while cycling two or more heating elements on and off during the duty cycle.

According to yet another aspect, a method for air frying food in a kitchen range is provided. The method includes (a) receiving a user selection to activate an air fry mode during which a food item is to be fried in said oven cavity using hot air rather than oil as a cooking medium, said air fry mode comprising a pre-determined plurality of sequential heating stages, (b) receiving a user input of a desired cooking temperature setpoint, (c) heating an oven cavity of the kitchen range during a first pre-heat stage of the plurality of sequential heating stages targeting a first target temperature comprising said setpoint plus a first offset, and (d) thereafter cooking the food within the oven cavity during a post-heat stage of the plurality of sequential heating stages, wherein during said post-heat stage a convection fan, a convection heating element and at least one of a bake heating element or a broil heating element is operated according to a post-heat duty cycle targeting a second target temperature, said second target temperature comprising said setpoint temperature and a second offset different than the first offset.

According to still another aspect, a cooking appliance includes a cabinet forming an oven cavity, a broil heating element, a bake heating element, a convection heating system including a fan and a convection heating element for developing a flow of heating air within the oven cavity, and a controller for separately controlling operation of each of the broil, bake and convection heating elements and of the convection fan for heating the oven cavity. The controller is configured to operate in an air fry mode where during each of a first pre-heat stage and a post-heat stage one or a plurality of said heating elements is/are operated according to a respective timed duty cycle, the controller being configured to operate at least two of the heating elements, each concurrently with operation of the convection fan, during the post-heat stage to target a post-heat target temperature different from a pre-heat target temperature that the controller is configured to target during the first pre-heat stage. The respective per-heat and post-heat target temperatures differ at least due to different respective offsets utilized during the first pre-heat stage and the post-heat stage.

The foregoing and other features of the invention are hereinafter described in greater detail with reference to the accompany drawings.

BRIEF DESCRIPTION OF THE DRAWINGS

The accompanying drawings, which are not necessarily to scale, show various aspects of the disclosure.

DETAILED DESCRIPTION

The present disclosure relates to a method for cooking using air as the cooking medium in a kitchen range, for example air frying a food item using a kitchen range. A kitchen range having a dedicated air fry capability also is described. Rather than using a traditional oil bath, hot air, and in some aspects, continuously moving hot air, is used as a cooking medium. A food item can be fried using a minimum of, or no, oil pre-applied as a coating to the food item, resulting in a healthier, cleaner and more efficient frying of the food item. By providing a kitchen range for the air frying, rather than a counter top unit dedicated to air frying, valuable counter top space is saved and versatility is added to a kitchen range which also may be used for various other cooking methods, such as baking, broiling, convect baking, etc.

Generally, a gas or electric kitchen range, as opposed to a countertop appliance, has a convection system and one or more additional heating elements configured to execute a predetermined cooking program/mode using hot air to cook food according to a dedicated cooking algorithm, such as an air fry cooking program/mode according to a dedicated air-fry cooking algorithm. The cooking algorithm utilizes a convection fan of the convection system to provide a generally uniform convective air-temperature throughout the associated oven cavity, in combination with temperature and/or time controlled heating stages. During at least one of the stages, the convection fan and two or more of the heating elements are operated according to either conventional hysteresis temperature control or a proportional-integral-derivative (PID) temperature control algorithm, in either case based on temperature feedback measured in the cavity.

The cooking program/method can be carried out with a cooking range, also herein referred to as a kitchen range, or similar cooking appliance that regulates the temperature of an oven cavity at a set point and evenly, uniformly heats the oven cavity. In general, cooking ranges and ovens have an oven cavity having heating elements (e.g., bake, broil, and convection elements). A controller (e.g., having a processor and memory) controls the power to the heating elements and/or other elements of the range such as convection fans, cooling fans, and a catalytic oven exhaust cleaner (an "air guard") element. A temperature sensor may also be disposed in the cooking range for measuring the temperature of the oven cavity and providing the measured temperature as a feedback signal to the controller. Utilizing these and other elements, the controller may operate the cooking appliance in accordance with a cooking program.

In a simple example, the program could be a baking function that turns on and regulates the bake heating element to achieve a desired cavity temperature. More complex cooking programs may be designed to cook food via hot air, such as in an air fry style. The following description relates to example embodiments for controlling such fan and heating elements to achieve a hot air cooking method, such as an air fry cooking method.

Figure 1:
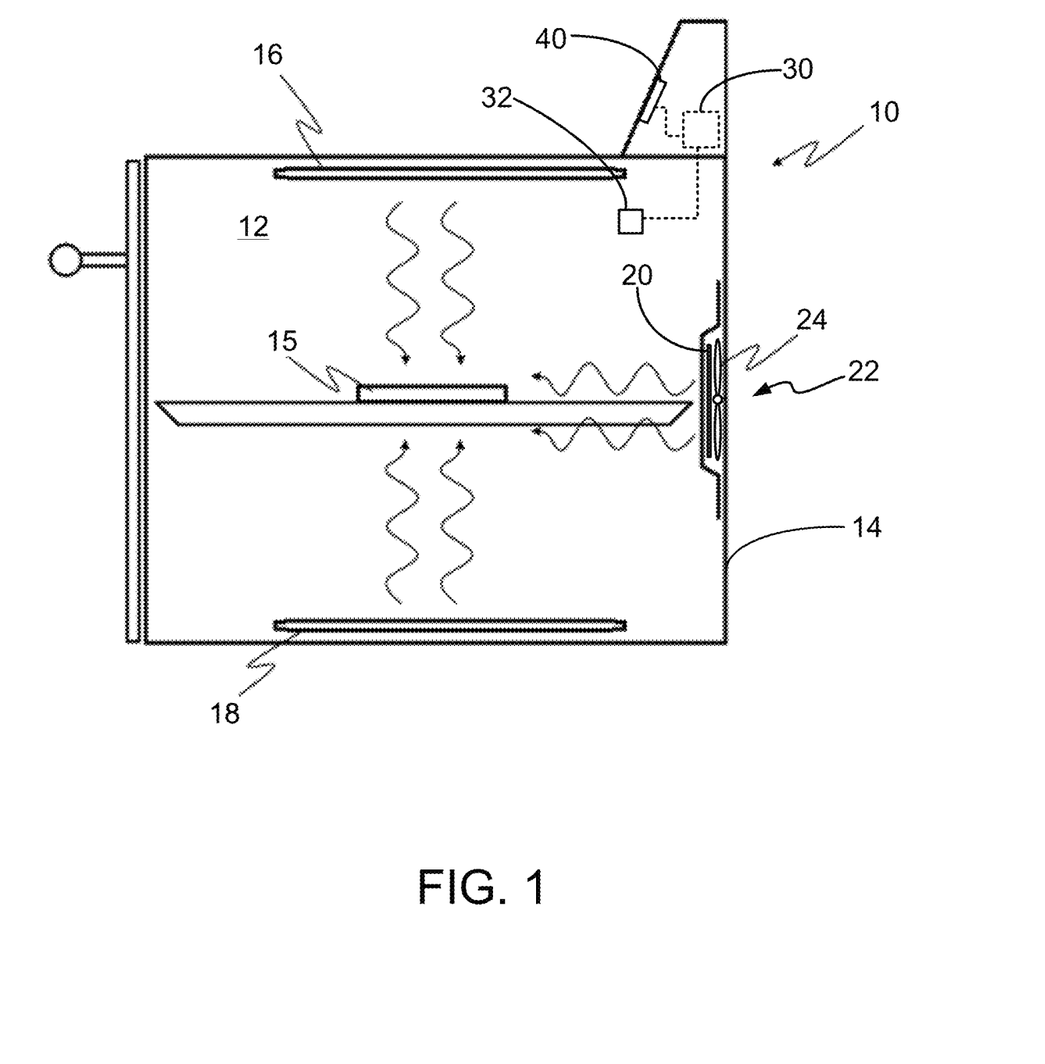
FIG. 1 schematically illustrates a side cross-section of a cooking appliance used for air fry style cooking.

Turning now to FIG. 1, a cooking appliance 10, such as a kitchen range, is illustrated having the above-identified fan and heating elements for heating an interior oven cavity 12 defined by an appliance cabinet 14. A food item 15 to be cooked is illustrated within the oven cavity 12. The heating elements for heating the oven cavity 12 and cooking the food item 15 include a broil heating element 16, a bake heating element 18, and a convection heating element 20. The broil heating element 16 is disposed at (i.e. in or adjacent) an upper portion of the oven cavity 12. The bake heating element 18 is disposed at (i.e. in or adjacent) a lower portion of the oven cavity 12, generally opposite the broil heat element 16. The convection heating element 20 is disposed at (i.e. in or adjacent) a back portion of the oven cavity 12.

The convection heating element 20 is part of a convection heating system 22 including the convection heating element 20 and an associated motive element for moving heated air, such as the convection fan 24. With respect to the illustrated fan 24, rotation of an impeller of the fan 24 enables distribution of heat provided by the convection heating element 20, and also by the broil and bake heating elements 16 and 18, throughout the oven cavity 12. Employing a convection fan to circulate air in a small, confined space such as an oven produces substantially uniform air distribution, which enables saturation of the cavity 12 with evenly heated air.

While the convection fan 24 is shown as being disposed adjacent the convection heating element 20, the fan 24, or another fan, may be otherwise disposed elsewhere within or relative to the oven cavity, such as not being specifically associated with the convection heating element 20. One or more additional heating elements may be provided in other embodiments, and/or one or more of the heating elements 16, 18 and 20 may be omitted.

Figure 2:
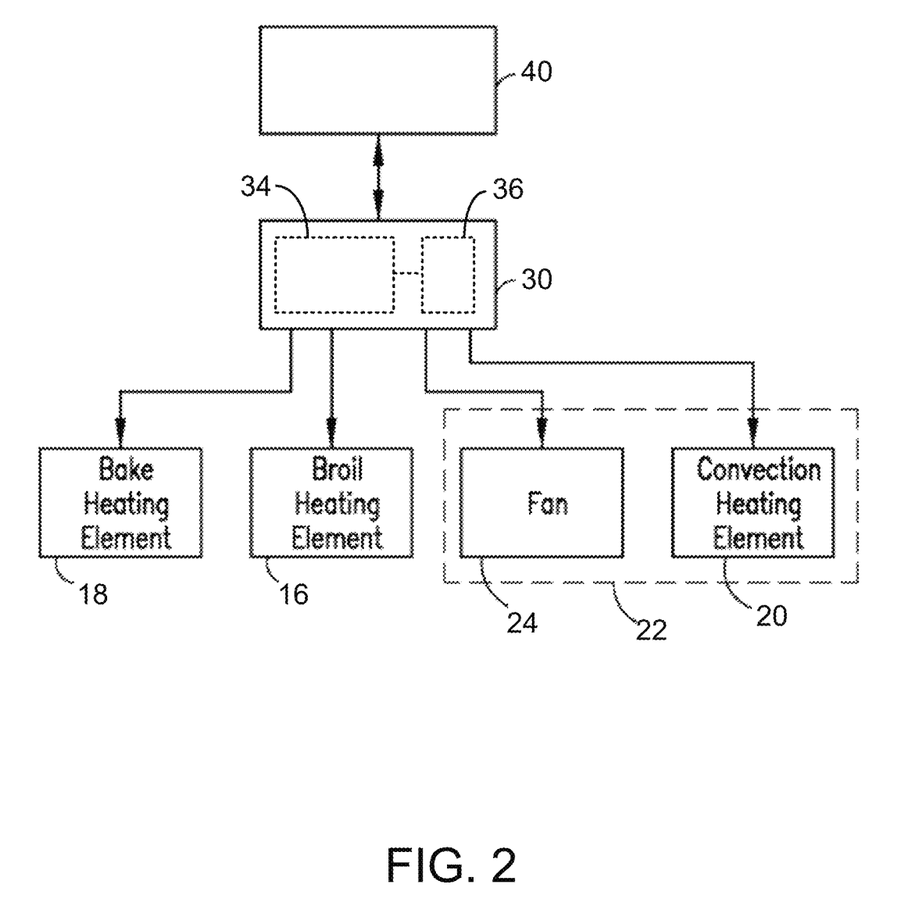
FIG. 2 schematically illustrates a control system of the cooking appliance of FIG. 1.

The cooking appliance 10 includes a control system 30, which while illustrated at an upper-rear location of the appliance 10 may be otherwise suitably located in other embodiments. The control system 30 is schematically illustrated at FIG. 2 and is provided for controlling operation of the heating elements 16, 18, and 20 and of the fan 24. As will be understood by one having ordinary skill in the art, the control system 30 of the cooking appliance 10 can be configured to operate any one of the heating elements 16, 18 and 20 and the fan 24 separately from one another or in conjunction with any one or more of the other of the heating elements 16, 18 and 20 and the fan 24. To provide this control, the control system 30 is communicatively connected to each of the heating elements 16, 18, and 20, to the fan 24, and to at least one sensor 32 (FIG. 1) disposed in the oven cavity 12 to monitor the temperature of the oven cavity 12. The control system 30 includes at least a processor 34 and a storage 36, such as a memory, which in other embodiments may be integral with the processor 34.

A "processor" as used herein refers to any, or part of any, electrical circuit comprised of any number of electrical components, including, for example, resistors, transistors, capacitors, inductors, and the like. The circuit may be of any form, including, for example, an integrated circuit, a set of integrated circuits, a microcontroller, a microprocessor, a collection of discrete electronic components on a printed circuit board (PCB) or the like. The processor may also stand alone or be part of a computer used for operations other than those of a cooking appliance. Implementation of these aspects may by hardware or software may be realized in any number of electronic devices and/or applications, including but not limited to, personal computers, servers, mobile phones, and the like. Moreover, the above aspects and/or combination of aspects may be stored in memory which is executable by one of said processors. It is also to be noted that the above description is non-limiting, and the examples are but only a few of many possible processors and implementations envisioned.

The storage 36 can include any suitable architecture for storing information to assist with operation of the cooking appliance 10. The storage 36 can provide a non-transient computer readable medium for containing program instructions for causing the processor 34 to perform one or more steps of one or more cooking methods. For example, program instructions for implementing an air fry algorithm for air frying the food item 15 within the oven cavity 12 may be included in the storage 36 and read and/or implemented by the processor 34.

In other embodiments some or all of the program instructions for implementing an air fry algorithm may be disposed at an external database communicatively connected to the control system 30 for being accessed by the control system 30. Such communication may be by way of any suitable wired or wireless connection, such as Bluetooth, Zigbee, cellular, WiFi, token ring, or the like.

Initiation of the air fry algorithm and setting or choosing an air fry cooking temperature may be caused by a user activating a control panel 40 of the control system 30. In other embodiments such actions may be implemented via an email, a mobile device, etc., where the control system 30 is suitably configured to receive said signal(s), data, etc.

The control system 30 further may be communicatively connected to a user feedback architecture, such as a display, auditory element or tactile element, for providing one or more of visual, audible or tactile feedback to the user. The feedback architecture may be integral with the illustrated control panel 40 or may be separately disposed in other embodiments. The feedback may include a notice that the food item 15 should be inserted into the oven cavity 12, such as upon completion of a pre-heat stage of a cooking method, for example. In some embodiment, the control system 30 may include the user feedback architecture 40.

In other embodiments, any of the aspects or combination of aspects described herein may be implemented or controlled via hardware or software. For example, these aspects may be implemented on a processor or a plurality of processors for controlling power output to various heating elements and fans of a cooking appliance. These processor (s) also may be embedded or integrated with other processors designed for a separate purpose, for example, as part of a central processing unit (CPU) for controlling an entirety of a cooking appliance (e.g., including displays).

Turning again to FIG. 1, the cooking appliance 10 depicted may be an electric or a gas cooking appliance and thus the cooking algorithm, to be described below in detail, may be implemented by either of an electric kitchen range or a gas kitchen range, having respectively electric or gas bake and broil heating elements in addition to a convection heating element, which typically is always electric, and an associated fan. In either case, a predetermined hot air cooking mode of the respective kitchen range is activated based on a user input selecting the respective mode, causing the control system 30 to implement the dedicated cooking algorithm. Upon selecting the respective mode, the user also will input or select a desired cooking temperature.

Once activated, the range executes the cooking algorithm to cook foods via hot convective air in the oven cavity. The dedicated cooking algorithm may have one or more different steps, temperatures, times, other aspects, etc. depending on whether the range is electric or gas. However, both the electric and gas algorithms will operate a plurality of the broil, bake and convection heating elements 16, 18 and 20, in conjunction with the fan 24 to cause heating of the oven cavity 12 and resultant hot air cooking of the food item 15.

For instance, the predetermined hot air cooking mode may be an air fry mode and a user may select the mode via a respective "Air Fry' mode user input, causing the control system 30 to implement the dedicated air fry algorithm. Upon selecting the 'Air Fry' mode, the user also will input or select a desired air frying temperature, and once activated, the range executes the air fry algorithm to fry foods via hot convective air in the oven cavity.

The food item 15 cooked in the cooking appliance 10 may or may not have a coating of oil preapplied to the food item 15 prior to frying the food item via said air fry mode. Where the oil is utilized, the coating of oil is generally effective to impart characteristics of traditional frying to the food item 15 once cooking is complete via said air fry mode, but without the need to immerse the food item 15 in oil as the cooking medium. Rather, hot convective air serves as the cooking medium.

Air Fry Method

Figure 3:
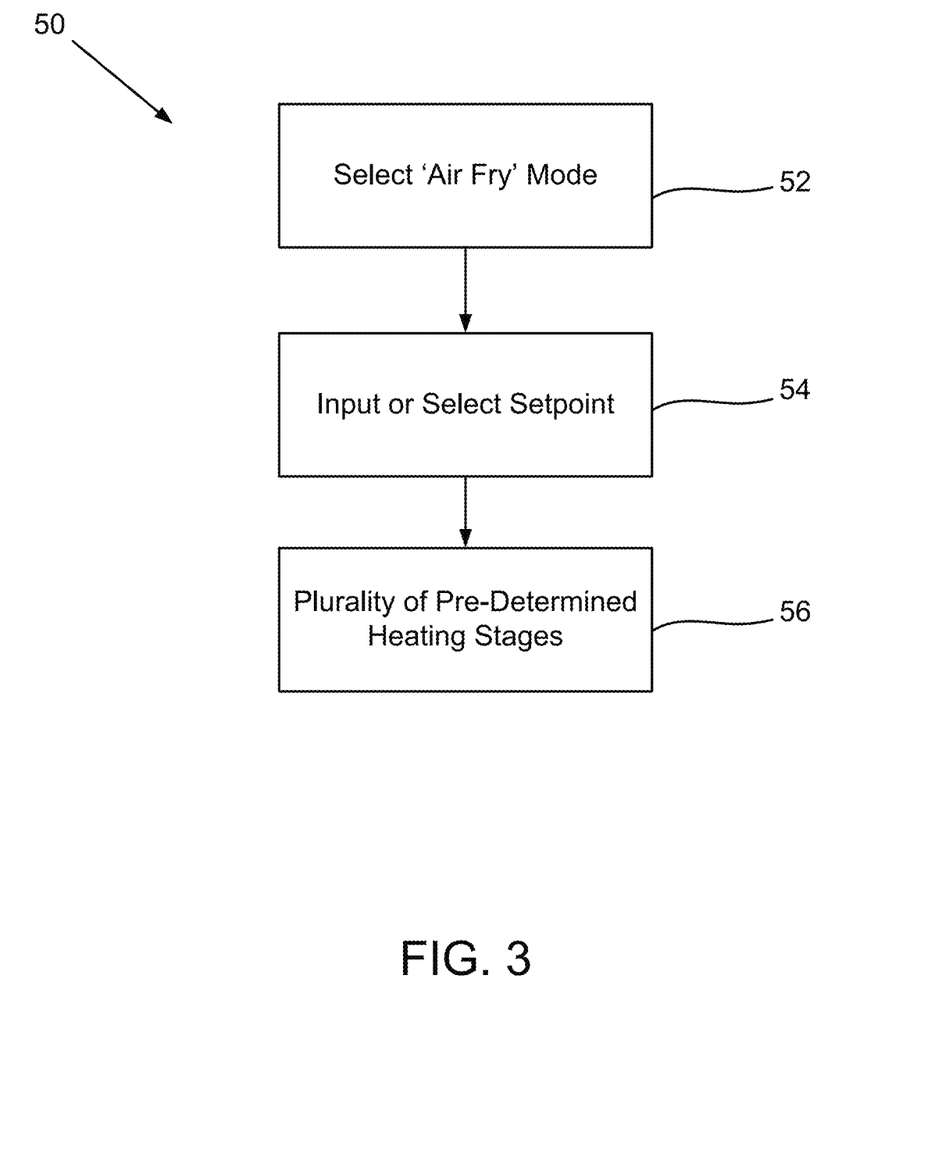
FIG. 3 illustrates an example method for carrying out an air fry style cooking operation in the cooking appliance of FIG. 1.

Referring now to FIG. 3, generally, an air fry method 50 for cooking food, such as the food item 15, in a cooking appliance 10, such as a kitchen range, and using the air fry algorithm of the present application, is illustrated. The exemplary cooking method is illustrated as a series of blocks. The method is not limited to the specific blocks shown or to the specific order of the blocks shown. More or fewer than all of the illustrated steps may be used to implement an example air frying embodiment. Furthermore, some air frying embodiments can employ additional or alternative, non-illustrated steps.

The illustrated method 50 includes an initial step 52 of selecting an 'Air Fry' cooking mode including a dedicated and pre-determined plurality of sequential heating stages. A desired air fry temperature is input or selected at step 54. At step 56, using the air fry algorithm described herein the oven cavity 12 is heated and the food item 15 is cooked during the pre-determined plurality of sequential heating stages. The pre-determined plurality of heating stages includes at least one initial pre-heat stage and at least one subsequent post-heat stage.

A total length of step 56 is indefinite, with at least an ultimate (i.e. final) post-heat stage of the air fry algorithm operating indefinitely until stopped. In some embodiments, the control system may allow for an overall operation time of the 'Air Fry' mode, where the 'Air Fry' mode is stopped upon completion of the overall operation time, though the air fry algorithm is configured to run indefinitely until externally stopped.

During the plurality of heating stages, feedback control for operating the heating elements 16, 18 and 20 and the fan 24 may be provided by both time and temperature parameters, where each respective heating stage of step 56 includes feedback control provided by at least a temperature parameter, but in some stages, which may be optional, also according to a time parameter. Specifically, during each of the heating stages, one or more of the plurality of heating elements 16, 18 and 20 at least is operated with temperature control according to a stage-specific timed duty cycle. Depending on the whether the air fry algorithm is operated in a gas range or in an electric range, each, or fewer than each, of the heating stages may include operation of a plurality of the heating elements 16, 18 and 20. Though, generally, a plurality of the heating elements are operated during each heating stage of a plurality of the heating stages.

Additionally, whenever operated, each of the broil, bake and convection heating elements 16, 18 and 20 will be run at a constant power level, rather than varying voltage or power supplied to the heating elements. To adjust the overall power output in a given cooking stage, the element(s) is/are operated according to the respective stage-specific timed duty cycle, but whenever active each element operates at constant power.

Also, depending on whether the air fry algorithm is operated in a gas range or in an electric range, each, or fewer than each, of the heating stages may include operation of the fan 24. Generally, the fan is operated at a majority of the heating stages of the plurality of heating stages. Further, both electric and gas algorithms are configured to run the fan 24 in a single direction and at a single speed.

Figure 4:
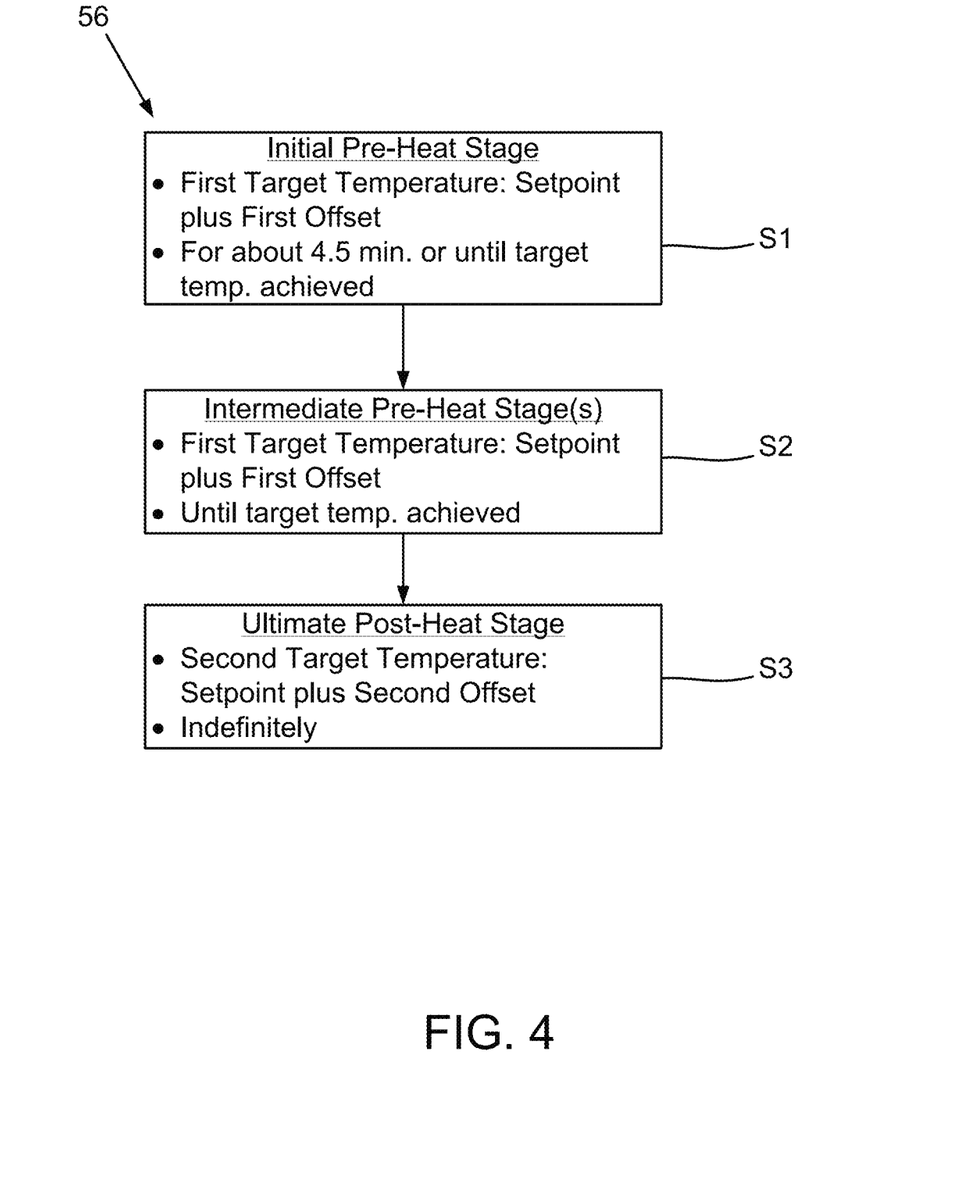
FIG. 4 illustrates a portion of an example method for carrying out the air fry style cooking operation in the cooking appliance of FIG. 1.

Referring now to FIG. 4, step 56 of the illustrated air fry method of FIG. 3 is further detailed via illustration of substeps including the plurality of sequential heating stages according to the air fry algorithm initiated at one of steps 52 or 54.

At an initial pre-heat stage S1 of the pre-determined plurality of heating stages, the oven cavity 12 is pre-heated according to a duty cycle bound by a finite timed parameter, running at least one of the plurality of heating elements 16, 18 and 20 during the duty cycle to approach and preferably achieve a first target temperature within the timed parameter. Alternatively, in some embodiments, the pre-heat stage S1 can be carried out until the target temperature actually is achieved.

Upon completion of the initial pre-heat stage S1, the air fry algorithm is configured to cause a user prompt to be issued. The prompt may be at least one of visual, audible or tactile, and is intended to notify the user that the food item(s) to be cooked should be inserted into the oven cavity 12. It will be appreciated that at the time of issuance of the prompt, the first target temperature may or may not yet be achieved depending on the thermal characteristics of the oven cavity and on whether stage S1 was programmed to run for only a fixed period of time or until the target temperature was achieved. Optionally, one or more intermediate pre-heat stage(s) S2 may be executed immediately following the first pre-heat stage S1.

The intermediate pre-heat stage(s) S2 is/are illustrated as being operated upon completion of the initial pre-heat stage S1, and after the user prompt, but before initiation of an ultimate post-heat stage S3. Indeed, operation of the intermediate stage(s) S2 is optional depending on whether the first target temperature was achieved during the initial pre-heat stage S1 if that stage was configured to continue only during a predetermined time period. Where the first target temperature was achieved, the intermediate stage(s) S2 may be skipped. Additionally, depending on whether the air fry algorithm is run on a gas kitchen range or on an electric kitchen range, the intermediate stage(s) S2 may include more than one separately defined intermediate stage. Where more than one intermediate stage S2 is included, operation of each of the more than one intermediate stages S2 may be optional, such as where the first target temperature already has been achieved. Regardless of the number of intermediate stages S2, during each stage S2, a plurality of heating elements are operated based on targeting the first target temperature.

At a subsequent post-heat stage S3 of the pre-determined plurality of heating stages, occurring after completion of stage S1 (as well as after any intermediate stage(s) S2 if present) and after the user prompt, the food is cooked within the oven cavity 12. The post-heat stage S3 continues indefinitely as implemented by the air fry algorithm until manually deactivated by the user or otherwise timed out, for example via a user-selected maximum air fry time.

During post-heat stage S3, at least two of the plurality of heating elements 16, 18 and 20 are operated during the respective stage-specific duty cycle. The two or more heating elements operated include the convection heating element 20, regardless of whether the air fry algorithm is used in conjunction with an electric or gas kitchen range. Furthermore, the convection heating element 20 is operated during a majority of the post-heat stage S3.

According to the duty cycle, when the at least two of the plurality of heating elements 16, 18 and 20 are operating, the air fry algorithm is configured also to operate the convection fan 24 to promote even heat distribution throughout the oven cavity 12. The fan 24 is operated whenever a heat element is operated, and thus the fan 24 operates during the full duty cycle of stage S3.

During post-heat stage S3, in the disclosed embodiment, the two or more heating elements and the fan 24 are operated according to the duty cycle based on a second target temperature that is different from the first target temperature targeted in stage S1 (and stage(s) S2 if present). Specifically, the first and second target temperatures differ at least due to different respective temperature offsets being utilized during the respective initial pre-heat stage S1 and ultimate post-heat stage S3. More specifically, the first target temperature generally is a setpoint temperature (corresponding to the user-selected air fry temperature) plus a first temperature offset. The second target temperature generally is the setpoint temperature plus a second temperature offset that is different from the first temperature offset.

The different offsets between the pre-heat and post-heat stages generally allow for proper air frying of the food. Selection of the first offset is specific to bringing a cold oven cavity to a frying temperature, taking account of cavity-specific factors such as the cavity thermal mass, heating rate(s) of the actuated heating element(s), whether the door is to be cycled open or not, the rate at which the cavity loses heat (i.e. insulation), and the effectiveness of air circulation within the cavity (i.e. presence or absence of stagnant air 'hotspots' in a particular cavity), as well as the specific setpoint temperature selected by the user, etc. That is, the first offset can be selected to ensure that the cavity is properly conditioned for insertion of food at the conclusion of the pre-heat stage(s) to begin the air-frying operation on the food. Selection of the second offset on the other hand typically will account for other factors recognizing that for the most part, and unlike pre-heat, the post-heat stage will occur largely at steady state. Such other factors can be, for example, the post-heat stage typically having a longer duration (such as indefinite), and the use of different heating element(s) than in in pre-heat. For example, it has been found that the convection heating element may be more desirable over other heating elements in post-heat, as compared to in pre-heat when air-frying food, which may be relevant to preventing over-crisping of the food item.

As will be appreciated, the respective offsets to the user-selected set point temperature can be selected for any of food-specific or thermal-behavior-specific reasons as noted, and may be determined via an iterative process for that particular cavity to ensure consistent air-fry results. For example, an offset may be added to account for presence of an air guard (a catalytic oven exhaust cleaner) because the air guard can increase the temperature of air in the oven cavity when turned on due to heat retention at the heat guard. Other conditions for which an offset may be added can include, for example, the particular insulation efficiency, heat capacity and other thermal properties of the respective cooking appliance, heating rate (i.e. wattage) of particular heating elements, air-circulation rate and efficiency, the presence or absence of so-called hotspots or circulation deadzones within the cavity, etc.

The specific offsets identified in the below-described embodiments are exemplary for an example kitchen range having particular thermal characteristics, particular burners, etc. Thus, different specific offsets may be determined iteratively for different kitchen ranges, though, maintaining the use of a different offset for a pre-heat stage as compared to a post-heat stage to provide effective air fry style cooking.

Also during the ultimate post-heat stage S3, the two or more heating elements and fan 24 are operated according to a predetermined, timed duty cycle operating via a hysteresis temperature control or PID temperature control algorithm based on feedback control.

In some embodiments, hysteresis temperature control may be utilized to maintain the oven cavity temperature within a set of pre-defined hysteresis boundaries encompassing (which may include) the second target temperature. Specifically, to achieve optimal air frying of a food item within the oven cavity 12, at least one of the pre-defined hysteresis boundaries utilized during the stage S3 may be a zero degree shift relative to the second target temperature, regardless of whether the air fry algorithm is run on a gas kitchen range or on an electric kitchen range. In other words, at least one of the pre-defined hysteresis boundaries can be the second target temperature.

In other embodiments, a PID temperature control algorithm may be utilized for controlling the duty cycle that operates the heating element(s) within the oven cavity 12 during the post-heat stage S3. PID control generally provides tighter temperature regulation around the target temperature compared to hysteresis temperature control. Briefly, a PID temperature control algorithm may calculate a gain by comparing an error of a detected temperature inside the oven cavity to a target temperature of the algorithm. In the case of a post-heat stage S3, the target temperature may be the second target temperature comprising the selected setpoint temperature plus the second offset. The error may be determined as a simple relationship between the detected temperature and the target temperature (e.g., a proportional gain), an accumulated error (e.g., an integral gain), a rate of change of error (e.g., a derivative gain), and/or other similar metrics.

The greater the difference between the temperature of the oven cavity and the target temperature, the longer the heating element(s) will be turned on during each duty cycle. As the temperature of the oven cavity approaches the target temperature, the PID temperature control algorithm activates the heating-element duty cycle for a shorter period of time. If the cavity temperature is above the target temperature, the elements can remain off until the temperature falls below the target temperature and the PID temperature control algorithm determines based on feedback temperature measurements that the heating-element duty cycle should be activated to resume or maintain the target temperature. This may occur when the PID temperature control algorithm calculates a zero or negative gain based on the operative condition or parameters of the oven. The PID temperature control algorithm continually recalculates the gain and, therefore, when the duty cycle is active.

PID control generally is known in the art and may be implemented in many ways. Indeed, such algorithms may be optimized according to a particular oven's thermal efficiencies and properties. For example, coefficients for the proportional, integral, and derivative gain calculations used in PID control may be tailored according to a particular cooking appliance, similar to the hysteresis bounds discussed herein for hysteresis temperature control, such as through iterative testing.

It is noted that while the below-provided exemplary embodiments utilize hysteresis temperature control during the respective post-heat stages S3, any of these exemplary embodiments instead may utilize a PID algorithm to control temperature fluctuation during the respective post heat stages S3. In that case, in lieu of the noted upper and lower hysteresis bounds for the duty cycle(s) of each stage, the PID algorithm instead would utilize respective P-, I- and/or D-gains or gain components in order to determine when the duty cycle should be operative to regulate cavity temperature.

Example Embodiments

The above-described air fry method is generally adapted for use with either of an electric kitchen range or a gas kitchen range as described herein. The associated air fry algorithm, including instructions for implementing the air fry method upon initiation of the 'Air Fry' mode, may be configured to operate the plurality of heating elements 16, 18 and 20 and the fan 24 differently when used with the electric kitchen range as opposed to the gas kitchen range.

Figure 5:
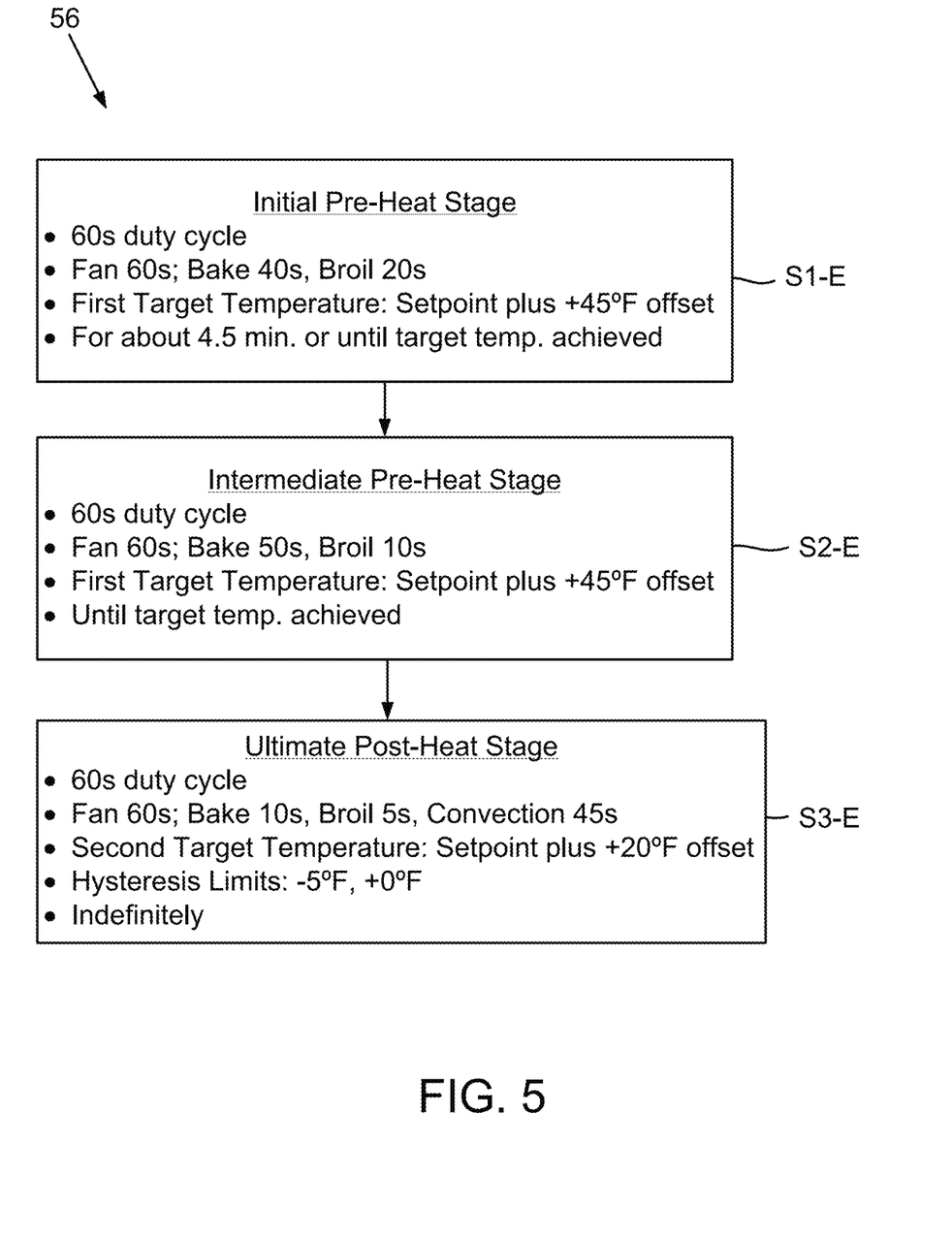
FIG. 5 illustrates a portion of another example method for carrying out the air fry style cooking operation in the cooking appliance of FIG. 1.

Turning to FIG. 5, a portion of an embodiment of the air fry algorithm for use with an electric kitchen range is illustrated. In this embodiment, the air fry algorithm is intended for use with an electric kitchen range where each of the broil, bake and convection heating elements 16, 18 and 20 are electric.

After selecting the 'Air Fry' mode and inputting or selecting a setpoint for air frying, the air fry algorithm is implemented to heat the oven cavity 12 and to cook a food item during the plurality of pre-determined heating stages of step 56 (FIG. 4). At the initial pre-heat stage S1-E, the stage-specific duty cycle length in this embodiment is 60 seconds, including the bake heating element 18 being operated for about the first 40 seconds of the duty cycle and the broil heating element 16 being operated for about the following 20 seconds of the duty cycle. The fan 24 also is operated for the full 60-second duty cycle, concurrently with operation of each of the bake heating element 18 and the broil heating element 16. The convection heating element is not active during any portion of the entire duty cycle. The stage S1-E is run—i.e., the duty cycle continuing to be cycled—until the first of either 4.5 minutes elapse or the measured temperature in the cavity achieves (i.e., reaches or exceeds) the first target temperature equal to the setpoint plus a +45° F. offset temperature.

After completion of the initial pre-heat stage S1-E, the air fry algorithm is configured to cause the user prompt to be issued, prompting the user to insert the food item to be air fried into the oven cavity 12.

Next, the optional intermediate pre-heat stage S2-E is run where the first target temperature has not yet been achieved during the first pre-heat stage S1-E. Where the first target temperature is already achieved during stage S1-E, the air fry algorithm progresses to the ultimate (i.e., final) post-heat stage S3-E, bypassing stage S2-E.

At the optional intermediate pre-heat stage S2-E, the stage-specific duty cycle length is 60 seconds, including the bake heating element 18 being operated for about the first 50 seconds of the duty cycle and the broil heating element 16 being operated for about the following 10 seconds of duty cycle. The fan 24 also is operated for the full 60-second length of the duty cycle, concurrently with operation of each of the bake heating element 18 and the broil heating element 16. Again, the convection heating element is inactive during this stage. The stage S2-E is run—i.e., the duty cycle continuing to be cycled—until the first target temperature is achieved.

At the ultimate post-heat stage S3-E, the stage-specific duty cycle length is 60 seconds, including the bake heating element 18 being operated for about the first 10 seconds of the duty cycle, the broil heating element 16 being operated for about the following 5 seconds of the duty cycle, and finally the convection heating element 20 being operated for about the next 45 seconds of the duty cycle. The fan 24 also is operated for the full 60-second length of the duty cycle, concurrently with operation of each of the bake heating element 18, the broil heating element 16, and the convection heating element 20. The stage S3-E is run indefinitely, with the duty cycle being cycled within the temperature-control parameters of the stage.

During the post-heat stage S3-E, the heating elements are operated according to the associated duty cycle according to hysteresis feedback control based on pre-defined hysteresis boundaries. The lower hysteresis limit during this post-heat stage S3-E is a −5° F. shift relative to the second target temperature and the upper hysteresis limit is a 0° F. shift relative to the second target temperature. The hysteresis temperature control is operated based on a second target temperature equal to the setpoint plus a second offset temperature of +20° F. As will be appreciated, the second offset temperature is less than the first offset temperature (i.e., the first offset temperature is greater than the second offset temperature).

It is noted that at least two of the plurality of heating elements 16, 18 and 20 are operated sequentially during each stages of the instant electric air-fry algorithm. The fan 24 is operated during the full duty cycles of each such stage.

Figure 6:
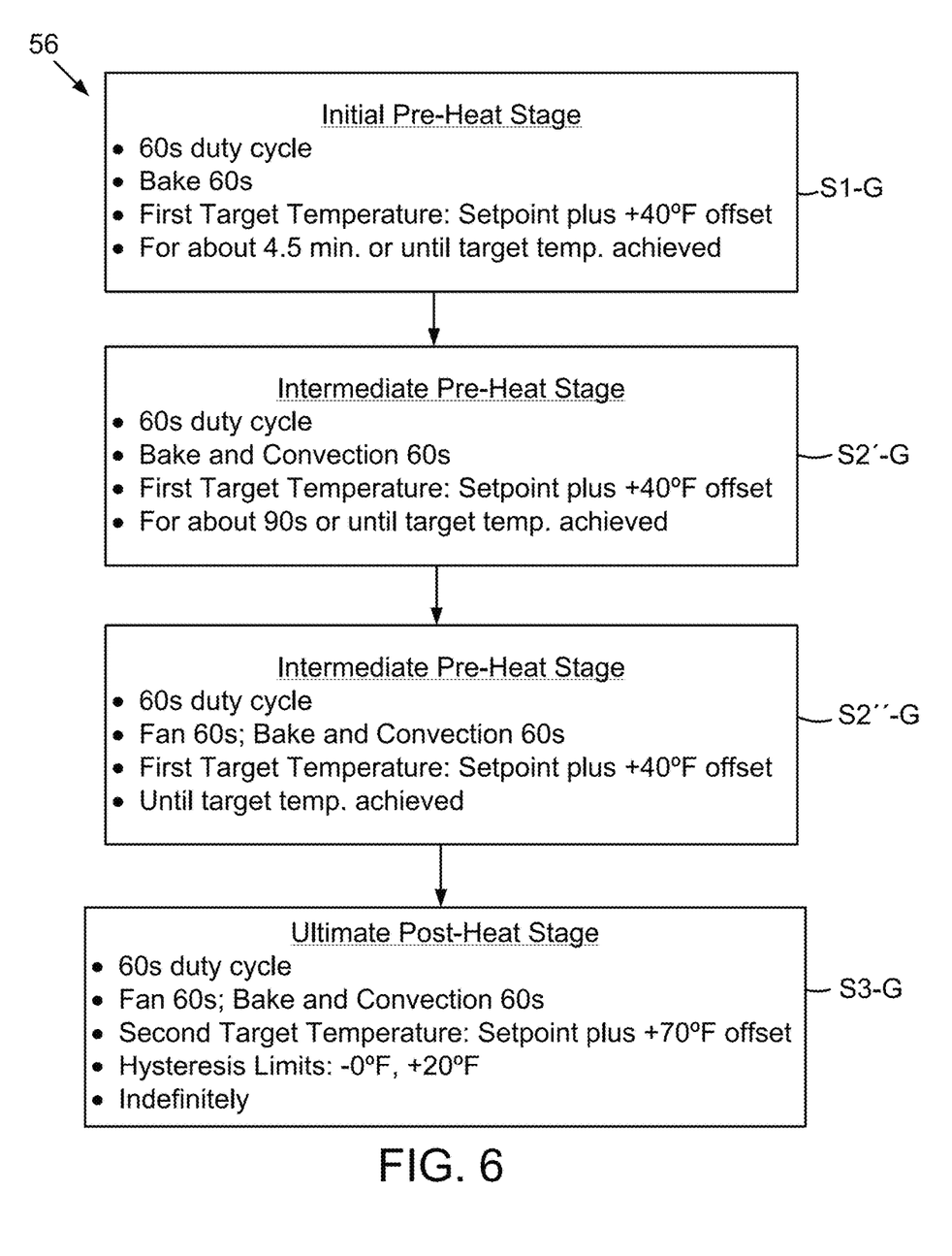
FIG. 6 illustrates a portion of yet another example method for achieving the air fry style cooking in the cooking appliance of FIG. 1.

Turning next to FIG. 6, a portion of an embodiment of the air fry algorithm for use with a gas kitchen range is illustrated. As described above, the air fry algorithm is intended for use with a gas kitchen range where at least the bake heating element 18 is gas and where the convection heating element 20 typically is electric-powered. Notably, the air fry algorithm in this embodiment does not utilize the broil heating element 16 at all.

After selecting the 'Air Fry' mode and inputting or selecting a setpoint air frying temperature, the air fry algorithm is implemented to heat the oven cavity 12 and to cook a food item during the plurality of pre-determined heating stages of step 56 (FIG. 4). At the initial pre-heat stage S1-G, the stage-specific duty cycle length is 60 seconds, wherein the bake heating element 18 is operated for the full duty cycle. No other heating element is operated during this time. The stage S1-G is executed—i.e. the duty cycle continuing to be cycled—until the first of either 4.5 minutes elapse or the first target temperature (equal to the setpoint plus a +40° F. offset temperature) is achieved (i.e., reached or exceeded).

After completion of the initial pre-heat stage S1-G, the air fry algorithm is configured to cause the user prompt to be issued, prompting the user to insert the food item to be air fried into the oven cavity 12.

Next, at least one of the optional intermediate pre-heat stages S2″-G and S2‴-G is run where the first target temperature has not yet been achieved. Where the first target temperature has already been achieved during or at completion of stage S1-G, the air fry algorithm progresses to the ultimate post-heat stage S3-G, bypassing stages S2′-G and S2″-G. Where the first target temperature has already been achieved during or at completion of stage S2″-G, the air fry algorithm progresses to the ultimate post-heat stage S3-G, bypassing stage S2″-G.

At the first optional intermediate pre-heat stage, S2″-G, the stage-specific duty cycle length is 60 seconds, during which each of the bake heating element 18 and the convection heating element 20 are operated for the full duty cycle. The stage S2″-G is executed—i.e. the duty cycle continuing to be cycled—until the first of either a 90 seconds elapse or the first target temperature is achieved.

The second intermediate pre-heat stage, S2″-G, is substantially the same as intermediate pre-heat stage S2′-G, except that the fan 24 is operated during the full duty cycle, whereas during pre-heat stage S2″-G the fan remains inactive. At the optional intermediate pre-heat stage S2″-G, the stage-specific duty cycle length is 60 seconds, during which again each of the bake heating element 18 and the convection heating element 20 is operated for the full duty cycle. The fan 24 also is operated for the full duty cycle, concurrently with operation of each of the bake heating element 16 and the convection heating element 20. The stage S2″-G is run—i.e. the duty cycle continuing to be cycled—until the first target temperature is achieved.

At the ultimate post-heat stage S3-G, the stage-specific duty cycle length is 60 seconds, during which each of the bake heating element 18 and the convection heating element 20 is operated for the full duty cycle. The fan 24 also is operated for the full duty cycle, concurrently with operation of the bake and convection heating elements 18 and 20. The stage S3-G is run indefinitely until manually deactivated by a user or otherwise timed out such as via a user-input maximum air-fry cooking time.

During this post-heat stage, the heating elements are operated according to the aforementioned duty cycle based on hysteresis feedback control between pre-defined hysteresis limits. The lower hysteresis limit in this embodiment is a 0° F. shift relative to the second target temperature and the upper hysteresis limit is a 20° F. shift relative to the second target temperature. The hysteresis temperature control is operated based on a second target temperature equal to the setpoint plus a second offset temperature of +70° F. As will be appreciated, the second offset temperature is greater than the first offset temperature (i.e., the first offset temperature is less than the second offset temperature).

In summary, a method 50 air fries food in an oven cavity 12, where air, not oil, is the cooking medium. Using a dedicated air fry algorithm to control a plurality of heating elements 16, 18, and 20 and an associated fan 24, a temperature of the oven cavity 12 is adjusted in a plurality of temperature and/or time regulated cooking stages S1-S3. An initial pre-heat stage S1 includes time control according to a stage-specific time duty cycle, and temperature control targeting a first target temperature including a user-selected oven cavity temperature plus a first offset. A subsequent post-heat stage S3 includes at least temperature control according to a stage-specific time duty cycle targeting a second target temperature including the user-selected temperature plus a second offset different from the first offset, where two or more heating elements 16, 18 and 20 and the associated fan 24 are operated during the respective duty cycle in accordance with either hysteresis- or PID-control. The invention has been described with reference to the example embodiments described above. Modifications and alterations will occur to others upon a reading and understanding of this specification and can be made thereto without departing from the spirit and the scope of the invention as set forth in the appended claims. Example embodiments incorporating one or more aspects of the invention are intended to include all such modifications and alterations insofar as they come within the scope of the appended claims and their equivalents.

What we claim is:

1. A method for cooking food via hot air in a kitchen range, the method comprising:
   receiving a user selection to activate a predetermined cooking mode including a pre-determined plurality of sequential heating stages;
   receiving a user input of a desired cooking temperature setpoint;
   heating an oven cavity of the kitchen range during a first pre-heat stage of the plurality of sequential heating stages targeting a first target temperature comprising said setpoint plus a first offset; and
   thereafter cooking the food within the oven cavity during a post-heat stage of the plurality of sequential heating stages, wherein during said post-heat stage a convection fan, a convection heating element and at least one of a bake heating element or a broil heating element is operated according to a post-heat duty cycle targeting a second target temperature, said second target temperature comprising said setpoint temperature and a second offset different than the first offset.

2. The method of claim 1, wherein the heating elements operated during the post-heat stage are operated via hysteresis temperature control with pre-defined hysteresis boundaries encompassing the second target temperature.

3. The method of claim 2, wherein at least one of the pre-defined hysteresis boundaries is a zero degree shift relative to the second target temperature.

4. The method of claim 2, wherein the pre-defined hysteresis boundaries are non-equal shifts relative to the second target temperature.

5. The method of claim 1, wherein the heating elements operated during the post-heat stage are operated via proportional-integral-derivative (PID) temperature control.

6. The method of claim 1, wherein the first offset is less than the second offset.

7. The method of claim 1, wherein the convection heating element is operated during a majority of the post-heat stage duty cycle.

8. The method of claim 7, wherein said convection element is inoperative during all pre-heat stages of said plurality of sequential heating stages.

9. The method of claim 1, wherein a plurality of the heating elements are operated during a majority of the heating stages of the pre-determined plurality of sequential heating stages.

10. The method of claim 1, further comprising cooking the food during a second pre-heat stage following the first pre-heat stage, wherein two or more of said heating elements are operated during the second pre-heat stage targeting the first target temperature.

11. The method of claim 1, further comprising providing a prompt to the user to insert the food to be cooked into the oven cavity upon completion of the first pre-heat stage.

12. The method of claim 1, wherein each of the plurality of heating elements operates at constant power whenever activated during the predetermined cooking mode.

13. The method of claim 1, wherein each of the first offset and the second offset is non-zero.

14. A method for air frying food in a kitchen range, the method comprising:
   receiving a user selection to activate an air fry mode during which a food item is to be fried in said oven cavity using hot air rather than oil as a cooking medium, said air fry mode comprising a pre-determined plurality of sequential heating stages;
   receiving a user input of a desired cooking temperature setpoint;
   heating an oven cavity of the kitchen range during a first pre-heat stage of the plurality of sequential heating stages targeting a first target temperature comprising said setpoint plus a first offset; and
   thereafter cooking the food within the oven cavity during a post-heat stage of the plurality of sequential heating stages, wherein during said post-heat stage a convection fan, a convection heating element and at least one of a bake heating element or a broil heating element is operated according to a post-heat duty cycle targeting a second target temperature, said second target temperature comprising said setpoint temperature and a second offset different than the first offset.

15. The method of claim 14, wherein a coating of oil is preapplied to the food item prior to frying the food item via said air fry mode, said coating of oil being effective to impart characteristics of traditional frying to the food item once cooking is complete via said air fry mode but without immersing the food item in oil as the cooking medium.

16. The method of claim 14, wherein no oil is preapplied to the food item prior to frying the food item via said air fry mode.

17. A method for air frying a food item in an oven cavity of a kitchen range, the method comprising:
   initially heating the oven cavity targeting a first target temperature during a first pre-heat stage via feedback control based on both time and temperature parameters;
   subsequently heating the oven cavity during a post-heat stage targeting a second target temperature via feedback control based on at least a temperature parameter;
   said oven cavity being heated during said post-heat stage according to a timed duty cycle during which a convection fan is operated for a full duration of the duty cycle while cycling two or more heating elements on and off during the duty cycle,
   wherein the first target temperature includes a user-desired setpoint temperature and a first offset, wherein the second target temperature includes said setpoint temperature and a second offset, and wherein each of the first and second offsets is different from one another.

18. The method of claim 17, said duty cycle being operated in accordance with a hysteresis temperature-control algorithm between two pre-defined hysteresis boundaries, one of which being equal to the second target temperature.

19. The method of claim 17, said duty cycle being operated in accordance with a PID temperature-control algorithm to maintain said second target temperature at or approximating said second target temperature.

20. The method of claim 17, further comprising heating the oven cavity during one or more additional pre-heat stages, and cycling two or more heating elements in accordance with respective duty cycles targeting the first target temperature during the respective additional pre-heat stages.

21. The method of claim 17, further comprising providing a prompt to insert the food item into the oven cavity upon completion of the first pre-heat stage.

22. The method of claim 17, wherein the duration of the post-heat stage is indefinite.

23. The method of claim 17, said duty cycle being operated in accordance with a hysteresis temperature-control algorithm between two pre-defined hysteresis boundaries being non-equal shifts relative to the second target temperature.

24. A cooking appliance, comprising:
- a cabinet forming an oven cavity;
- a broil heating element;
- a bake heating element;
- a convection heating system including a convection fan and a convection heating element for developing a flow of heating air within the oven cavity; and
- a controller for separately controlling operation of each of the broil, bake and convection heating elements and of the convection fan for heating the oven cavity, the controller configured to operate in an air fry mode wherein during each of a first pre-heat stage and a post-heat stage one or a plurality of said heating elements is/are operated according to a respective timed duty cycle, said controller being configured to operate at least two of the heating elements, each concurrently with operation of the convection fan, during the post-heat stage to target a post-heat target temperature different from a pre-heat target temperature that the controller is configured to target during the first pre-heat stage, the respective pre-heat and post-heat target temperatures differing at least due to different respective offsets utilized during the first pre-heat stage and the post-heat stage.

25. The cooking appliance of claim 24, the controller being configured to operate the at least two heating elements operated during the post-heat stage under hysteresis temperature control with pre-defined hysteresis boundaries, and wherein at least one of the pre-defined hysteresis boundaries is a zero degree shift relative to the post-heat target temperature.

26. The cooking appliance of claim 24, the controller being configured to operate the at least two heating elements operated during the post-heat stage under PID temperature control.

27. The method of claim 17, wherein each of the first offset and the second offset is non-zero.

28. The method of claim 24, wherein each of the pre-heat and post-heat target temperatures includes a common user-desired setpoint temperature and a respective pre-heat or post-heat offset temperature, and wherein each of the pre-heat and post-heat offset temperatures is non-zero.

29. The method of claim 24, the controller being configured to operate the at least two heating elements operated during the post-heat stage under hysteresis temperature control with pre-defined hysteresis boundaries being non-equal shifts relative to the second target temperature.

* * * * *

UNITED STATES PATENT AND TRADEMARK OFFICE
CERTIFICATE OF CORRECTION

PATENT NO. : 10,561,277 B1
APPLICATION NO. : 16/366477
DATED : February 18, 2020
INVENTOR(S) : Swayne et al.

Page 1 of 1

It is certified that error appears in the above-identified patent and that said Letters Patent is hereby corrected as shown below:

In the Specification

Column 11, Line 65: please replace "S2"-G and S2'"-G" with -- S2'-G and S2"-G --

Column 12, Line 7: please replace "S2"-G" with -- S2'-G --

Column 12, Line 11: please replace "S2"-G" with -- S2'-G --

Signed and Sealed this
Twelfth Day of May, 2020

Andrei Iancu
*Director of the United States Patent and Trademark Office*